US008531439B2

(12) United States Patent
Ijzerman et al.

(10) Patent No.: US 8,531,439 B2
(45) Date of Patent: Sep. 10, 2013

(54) SWITCHABLE DISPLAY DEVICE (75) Inventors: Willem Lubertus Ijzerman, Eindhoven (NL); Marcellinus Petrus Carolus Michael Krijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1252 days.

(21) Appl. No.: 12/067,964

(22) PCT Filed: Aug. 31, 2006

(86) PCT No.: PCT/IB2006/053042
§ 371 (c)(1),
(2), (4) Date: Mar. 25, 2008

(87) PCT Pub. No.: WO2007/036816
PCT Pub. Date: Apr. 5, 2007

(65) Prior Publication Data
US 2008/0252639 A1    Oct. 16, 2008

(30) Foreign Application Priority Data
Sep. 28, 2005  (EP) ..................................... 05108937

(51) Int. Cl.
*G09G 5/00*  (2006.01)
(52) U.S. Cl.
USPC ......................................................... 345/204
(58) Field of Classification Search
None
See application file for complete search history.

(56) References Cited

U.S. PATENT DOCUMENTS

| 2,000,912 | A | | 5/1935 | Bates |
| 3,060,795 | A | * | 10/1962 | Corrigan et al. ............... 352/131 |
| 5,892,505 | A | * | 4/1999 | Tropper ........................ 345/208 |
| 6,064,424 | A | | 5/2000 | Van Berkel et al. |
| 6,069,650 | A | | 5/2000 | Battersby |
| 6,246,451 | B1 | | 6/2001 | Matsumura et al. |
| 6,437,915 | B2 | | 8/2002 | Moseley et al. |
| 7,058,252 | B2 | * | 6/2006 | Woodgate et al. ............... 385/16 |

(Continued)

FOREIGN PATENT DOCUMENTS

| EP | 0788008 A1 | 8/1997 |
| EP | 1403759 A2 | 3/2004 |
| WO | 03007620 A1 | 1/2003 |
| WO | 03015424 A2 | 2/2003 |
| WO | 2005055617 A1 | 6/2005 |

OTHER PUBLICATIONS

Alan Sullivan: 58.3: A Solid-State Multi-Planar Volumetric Display, SID 2003, pp. 1531-1533.

(Continued)

*Primary Examiner* — William Boddie
*Assistant Examiner* — Carolyn R Edwards
(74) *Attorney, Agent, or Firm* — Larry Liberchuk (57) ABSTRACT A switchable display device (100) which is arranged to switch between a two-dimensional view mode and a three-dimensional view mode is disclosed. The switchable display device (100) comprises: a structure (104) of light generating elements (105-108) for generating light on basis of respective driving values; and optical directory means (110) for directing the generated light in dependence of an actual view mode, the actual view mode being either the two-dimensional view mode or the three-dimensional view mode. The switchable display device (100) is arranged to alternately display two-dimensional image data and three-dimensional image data, while the optical directory means (110) are switched synchronously; the 2D/3D switching is performed at a predetermined frequency, sufficiently high so that the observer can perceive a 2D window and a 3D window simultaneously.

9 Claims, 8 Drawing Sheets (56) References Cited

U.S. PATENT DOCUMENTS

| | | | |
|---|---|---|---|
| 7,477,331 B2* | 1/2009 | Lin et al. | 349/15 |
| 8,035,762 B2* | 10/2011 | Ijzerman et al. | 349/15 |
| 2003/0063186 A1 | 4/2003 | Tomono | |
| 2003/0117489 A1 | 6/2003 | Jones et al. | |
| 2004/0027267 A1* | 2/2004 | Rousso | 342/1 |
| 2004/0136589 A1* | 7/2004 | Breslow | 382/154 |
| 2006/0139448 A1* | 6/2006 | Ha et al. | 348/51 |

OTHER PUBLICATIONS

D. F. McAllister, Stereo Computer Grapics and Other True 3D Technologies, Princeton University Press, Aug. 1993, Chapter 6.

J. Eichenlaub: A Lightweight Compact 2D/3D Autostereoscopic LCD Backlight for Games, Monitor and Notebook Applications, Proceedings of SPIE, vol. 3295, 1998.

* cited by examiner

SWITCHABLE DISPLAY DEVICE

The invention relates to a switchable display device which is arranged to switch between a two-dimensional view mode and a three-dimensional view mode, the switchable display device comprising:

a structure of light generating elements for generating light on basis of respective driving values; and optical directory means for directing the generated light in dependence of an actual view mode, the actual view mode being either the two-dimensional view mode or the three-dimensional view mode.

Since the introduction of display devices, a realistic three-dimensional (3D) display device has been a dream for many. Many principles that should lead to such a display device have been investigated. Some principles try to create a realistic 3D object in a certain volume. For instance, in the display device as disclosed in the article "Solid-state Multi-planar Volumetric Display", by A. Sullivan in proceedings of SID'03, 1531-1533, 2003, information is displaced at an array of planes by means of a fast projector. Each plane is a switchable diffuser. If the number of planes is sufficiently high the human brain integrates the picture and observes a realistic 3D object. This principles allows a viewer to look around the object within some extend. In this display device all objects are (semi-) transparent.

Many others try to create a 3D display device based on binocular disparity only. In these systems the left and right eye of the viewer perceive another image and consequently, the viewer perceives a 3D image. An overview off these concepts can be found in the book "Stereo Computer Graphics and Other True 3D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3D without the need for additional appliances are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different images in his left and right eye if he is positioned at the correct spot, and is able to perceive a 3D picture.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance U.S. Pat. Nos. 6,064,424 and US20000912. In the display devices as disclosed in U.S. Pat. No. 6,064,424 and US20000912 a slanted lenticular is used, whereby the width of the lenticular is larger than two sub-pixels. In this way there are several images next to each other and the viewer has some freedom to move to the left and right.

A drawback of auto-stereoscopic display devices is the resolution loss incorporated with the generation of 3D images. It is advantageous that those display devices are switchable between a (two-dimensional) 2D and 3D mode, i.e. a single-view mode and a multi-view mode. If a relatively high resolution is required, it is possible to switch to the single view mode since that has higher resolution.

An example of such a switchable display device is described in the article "A lightweight compact 2D/3D autostereoscopic LCD backlight for games, monitor and notebook applications" by J. Eichenlaub in proceedings of SPIE 3295, 1998. It is disclosed that a switchable diffuser is used to switch between a 2D and 3D mode. Another example of a switchable auto-stereoscopic display device is described in WO2003015424 where LC based lenses are used to create a switchable lenticular. See also U.S. Pat. No. 6,069,650.

In principle it is possible to switch the entire display device from 2D to 3D and vice versa. Alternatively, only a portion of the display device e.g. corresponding to a window of a graphical application, is switched. That switching may be achieved by passive matrix addressing. The drawback is that the number of windows (i.e. portions having a different view mode compared to the rest of the display device) that can be made with a passive matrix scheme are limited. There are also limits related to the shapes of such portions. For example it is difficult to create a large round circle that is in two-dimensional view mode while the remainder is in three-dimensional view mode.

It is an object of the invention to provide switchable display device of the kind described in the opening paragraph which is arranged to show multiple windows whereby at least one of the multiple windows is in the two-dimensional view mode and at least one of the multiple windows is in the three-dimensional view mode.

This object of the invention is achieved in that the switchable display device is arranged to alternately display with a predetermined frequency:

two-dimensional image data by providing corresponding driving values to at least a first part of the structure of light generating elements, while the optical directory means are in the two-dimensional view mode; and three-dimensional image data by providing corresponding driving values to at least a second part of the structure of light generating elements, while the optical directory means are in the three-dimensional view mode, the second part of the structure of light generating elements being complementary with the first part of the structure of light generating elements.

In other words, time sequentially two-dimensional image data and three-dimensional image data is shown while the optical directory means are switched synchronously. That means that the flexibility of individually addressing the light generating elements is applied to create multiple windows with optionally arbitrary shapes.

Preferably the predetermined frequency is higher than 18 Hz or even higher. As long as the predetermined frequency is high enough the observer of the switchable display device can perceive a two-dimensional window and a three-dimensional window on the display device simultaneously. That means that, although the two-dimensional image data and the three-dimensional image data is actually not displayed simultaneously, it is perceived as being displayed simultaneously. The predetermined frequency is that high that the human observer can not distinguish from two-dimensional image data and three-dimensional image data actually being displayed simultaneously.

An embodiment of the switchable display device according to the invention is arranged to provide the second part of the structure of light generating elements with background driving values which result in substantially no light generation, while the optical directory means are in the two-dimensional view mode. In this embodiment of the switchable display device according to the invention, light is generated alternately by the first part of the structure of light elements and the second part of the structure of light elements. In the two-dimensional view mode, a portion of the display device corresponding to the first part of the structure of light generating elements, generates a two-dimensional picture while the rest of the display device represents a substantially dark background. An advantage of this embodiment is a clear separation between two-dimensional image data and three-dimensional image data.

An embodiment of the switchable display device according to the invention is arranged to provide the first part of the structure of light generating elements with further background driving values which result in substantially no light generation, while the optical directory means are in the three-dimensional view mode. In this embodiment of the switchable display device according to the invention, light is generated alternately by the first part of the structure of light elements and the second part of the structure of light elements. In the three-dimensional view mode, a portion of the display device corresponding to the second part of the structure of light generating elements, generates a three-dimensional picture while the rest of the display device represents a substantially background. An advantage of this embodiment is a clear separation between two-dimensional image data and three-dimensional image data.

An embodiment of the switchable display device according to the invention further comprises first low pass filtering means for deriving background driving values from the three-dimensional image data is arranged to provide the background driving values to the second part of the structure of light generating elements while the optical directory means are in the two-dimensional view mode. In the two-dimensional view mode, a portion of the display device corresponding to the first part of the structure of light generating elements generates a two-dimensional picture while the rest of the display device represents a background, which is based on a three-dimensional picture. The three-dimensional picture may have been displayed preceding the two-dimensional picture or may be displayed succeeding the two-dimensional picture. An advantage of this embodiment is that the average light output of the display device is relatively high, i.e. not limited by the switching between the two-dimensional view mode and the three-dimensional view mode.

An embodiment of the switchable display device according to the invention further comprises second low pass filtering means for deriving further background driving values from the two-dimensional image data and is arranged to provide the further background driving values to the first part of the structure of light generating elements while the optical directory means are in the three-dimensional view mode. In the three-dimensional view mode, a portion of the display device corresponding to the second part of the structure of light generating elements generates a three-dimensional picture while the rest of the display device represents a background that is based on a two-dimensional picture. The two-dimensional picture may have been displayed preceding the three-dimensional picture or may be displayed succeeding the three-dimensional picture. An advantage of this embodiment is that the average light output of the display device is relatively high, i.e. not limited by the switching between the two-dimensional view mode and the three-dimensional view mode.

In an embodiment of the switchable display device according to the invention the periods during which three-dimensional image data is displayed are substantially equal to the periods in which two-dimensional image data is displayed. For instance the optical directory means are subsequently in the two-dimensional view mode during a period of 6 msec and in the three-dimensional view mode during a period of 6 msec too. An advantage of this embodiment of the invention is that large area flicker is relatively low.

In an embodiment of the switchable display device according to the invention the periods during which three-dimensional image data is displayed are substantially two times as long as the periods in which two-dimensional image data is displayed. An advantage of this embodiment of the invention is that large area flicker is relatively low. Notice that during the three-dimensional view mode typically the amount of observed light is lower than during the two-dimensional view mode. This is because a part of the generated light by the structure of light generating elements may not be observed during the three-dimensional view mode. E.g. in the case of a barrier as light directory means a relatively large portion of the generated light is absorbed by the barrier in the three-dimensional view mode. By extending the periods in which three-dimensional image data is displayed relative to the periods in which two-dimensional image data is displayed compensation is realized for this light reduction effect.

In an embodiment of the switchable display device according to the invention the optical directory means comprises a set of lenses which can be switched between a first state and a second state, the first state corresponding to the two-dimensional view mode and the second state corresponding to the three-dimensional view mode. The optical directory means are e.g. as disclosed in U.S. Pat. No. 6,069,650. An advantage of this embodiment of the switchable display device according to the invention is that most of the light which is generated by the structure of light generating elements is directed to the observer.

In an alternative embodiment of the switchable display device according to the invention the optical directory means comprises a set of barriers which can be switched between a substantially transparent state and a substantially absorbing state, the substantially transparent state corresponding to the two-dimensional view mode and the substantially absorbing state corresponding to the three-dimensional view mode. The optical directory means are e.g. as disclosed in U.S. Pat. No. 6,437,915.

Preferably the optical directory means comprises liquid crystals (LC) and electrodes for providing a voltage across the liquid crystals.

These and other aspects of the switchable display device, according to the invention will become apparent from and will be elucidated with respect to the implementations and embodiments described hereinafter and with reference to the accompanying drawings, wherein.

Figure 1:
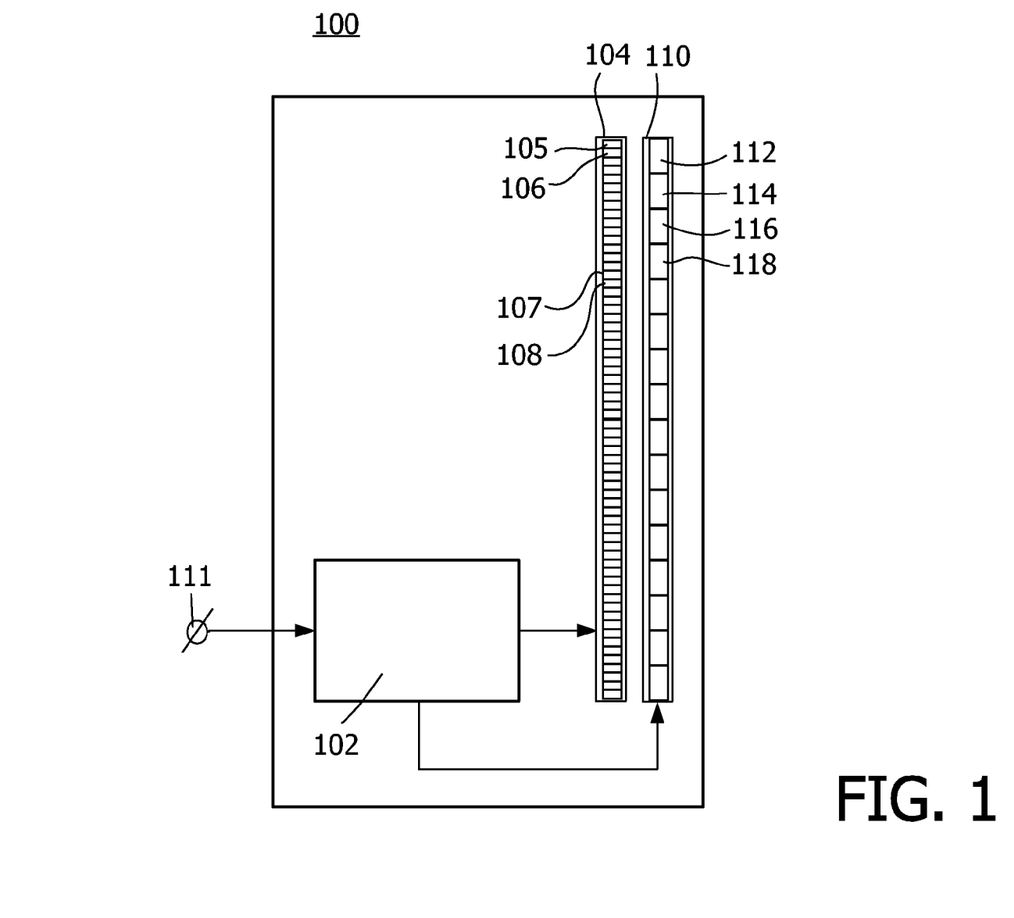
FIG. 1 schematically shows an embodiment of the switchable display device.

FIG. 1 schematically shows an embodiment of the switchable display device 100 according to the invention, which is arranged to switch between a two-dimensional view mode and a three-dimensional view mode. The switchable display device 100 comprises:

receiving means 102 for receiving an information signal which is provided at the input connector 111. The information signal may be a broadcast signal received via an antenna or cable but may also be a signal from a storage device like a VCR (Video Cassette Recorder) or Digital Versatile Disk (DVD). The information signal may also be provided by a PC (personal computer) or some other multimedia device;

a structure 104 of light generating elements 105-108 for generating light on basis of respective driving values which are derived from the information signal;

optical directory means 110 for directing the generated light in dependence of an actual view mode, the actual view mode being either the two-dimensional view mode or the three-dimensional view mode.

The structure 104 of light generating elements 105-108 are located in a first plane and the optical directory means 110 comprises a group of optical directory elements 112-118 each of which is associated with a respective group of light generating elements 105-108. The optical directory means 110 overlay the light generating elements 105-108 in the first plane for directing the outputs of the light generating elements 105-108 in mutually different angular directions relative to the first plane when the optical directory means 110 are in the three-dimensional view mode. The optical directory means 110 have no substantially effect on the direction of the outputs of the light generating elements 105-108 when the optical directory means 110 are in the two-dimensional view mode.

The structure 104 of light generating elements 105-108 may be an LCD, CRT, PDP or an alternative display screen. Preferably, the display frequency of the display screen is relatively high, e.g. above 100 Hz.

Preferably the optical directory means 110 comprises a set of lenses 112-118 which can be switched between a first state and a second state, the first state corresponding to the two-dimensional view mode and the second state corresponding to the three-dimensional view mode. The optical directory means 110 are e.g. as disclosed in U.S. Pat. No. 6,069,650. See also the description in connection with FIG. 2A and FIG. 2B.

Alternatively the optical directory means 110 comprises a set of barriers 112-118 which can be switched between a substantially transparent state and a substantially absorbing state, the substantially transparent state corresponding to the two-dimensional view mode and the substantially absorbing state corresponding to the three-dimensional view mode. The optical directory means 110 are e.g. as disclosed in U.S. Pat. No. 6,437,915.

Preferably the predetermined frequency, i.e. the frequency of switching between the two-dimensional view mode and the three-dimensional view mode is relatively high, e.g. above 100 Hz. The switching between the three-dimensional view mode and the two-dimensional view mode by the optical directory means 110 is preferably synchronized by the refreshing of the driving values within the structure 104 of light generating elements.

The switchable display device 100 is arranged to alternately display with a predetermined frequency:

two-dimensional image data by providing corresponding driving values to at least a first part 105-106 of the structure 104 of light generating elements, while the optical directory means 110 are in the two-dimensional view mode; and three-dimensional image data by providing corresponding driving values to at least a second part 107-108 of the structure 104 of light generating elements, while the optical directory means 110 are in the three-dimensional view mode, the second part 107-108 of the structure 104 of light generating elements being complementary with the first 105-106 part of the structure 104 of light generating elements.

It should be noted that although the first part 105-106 of the structure 104 of light generating elements is complementary with the second part 107-108 of the structure 104 of light generating elements this does not exclude that a number of the first part 105-106 of the structure 104 of light generating elements is provided with non-zero driving values while the optical directory means 110 are in the three-dimensional view mode. It does also not exclude that a number of the second part 107-108 of the structure 104 of light generating elements is provided with non-zero driving values while the optical directory means 110 are in the two-dimensional view mode. With non-zero driving values is meant driving values resulting in actual light being generated by the respective light generating elements.

The switchable display device 100 might e.g. be a TV or monitor. Optionally the image processing apparatus 100 comprises storage means, like a hard-disk or means for storage on removable media, e.g. optical disks.

Figure 2A:
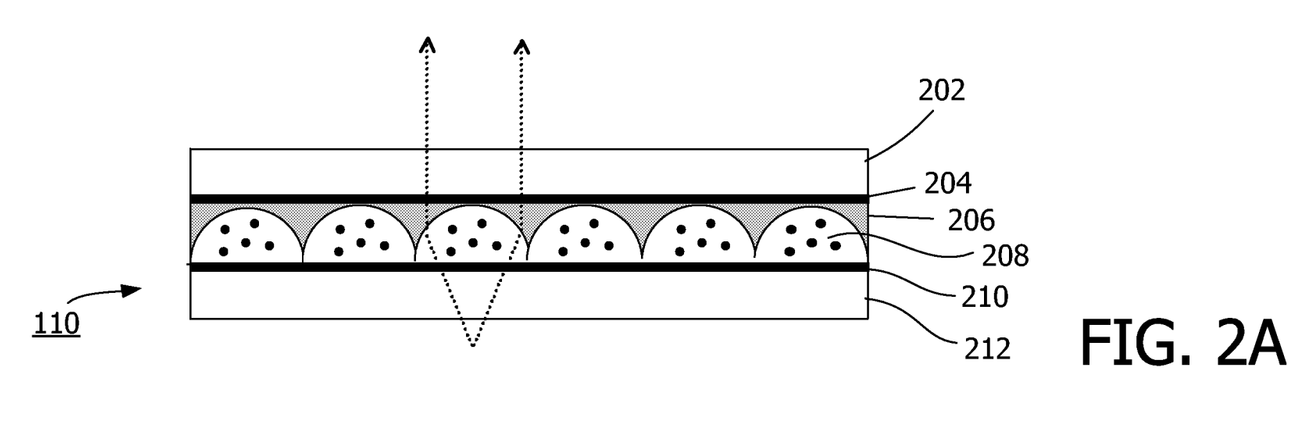
FIG. 2A schematically shows the optical directory means of an embodiment of the switchable display device which is in the three-dimensional view mode.
Figure 2B:
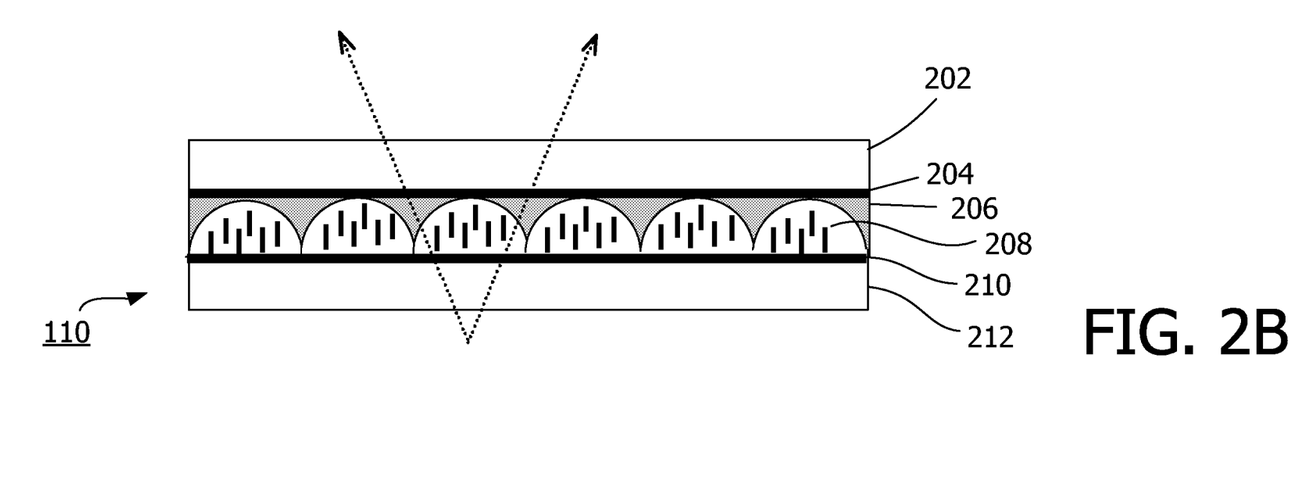
FIG. 2B schematically shows the optical directory means of FIG. 2A which is in the two-dimensional view mode.

FIG. 2A schematically shows the optical directory means 110 of an embodiment of the switchable display device which is in the three-dimensional view mode. FIG. 2B schematically shows the optical directory means 110 of FIG. 2A which is in the two-dimensional view mode. The optical directory means 110 comprises:

a transparent cover 202;
a set of transparent electrodes 204 and 210, preferably made of Indium Tin Oxide (ITO);
a liquid Crystal (LC) layer 208;
a replica 206; and
a substrate 212.

The working of the optical directory means 110 is as follows. Suppose that the polarization direction of the incident light is perpendicular to the drawing. The electrodes 204,210 are covered with an orientation layer that orients the LC molecules with their long axis perpendicular to the drawing. That corresponds to the three-dimensional view mode as depicted in FIG. 2A. In case a voltage is applied across the LC layer, the molecules are oriented vertically. That corresponds to the two-dimensional view mode as depicted in FIG. 2B. The LC layer 208 behaves like a birefringent medium. Typically, the ordinary index of refraction (oriented perpendicular to the long axis of the LC molecules) is $n_o=1.4$-$1.5$. Preferably, no is matched to the index of refraction of the substrate 212, the cover 202 and the replica 206. The extraordinary index of refraction (oriented along the long axis of the LC molecules) is higher: $n_e=1.7$.

In the three-dimensional view mode, since the polarization direction of the incident light is perpendicular to the drawing, the light experiences the index of refraction $n_e=1.7$ in the LC layer. The jump in index of refraction from LC layer 208 to replica 206 causes a lens action.

In the two-dimensional view mode, the light experiences an index of refraction $n_o=1.4$-$1.5$ in the LC layer. This index of refraction is closely matched to that of the replica 206 and no lens action occurs.

Figure 3A:
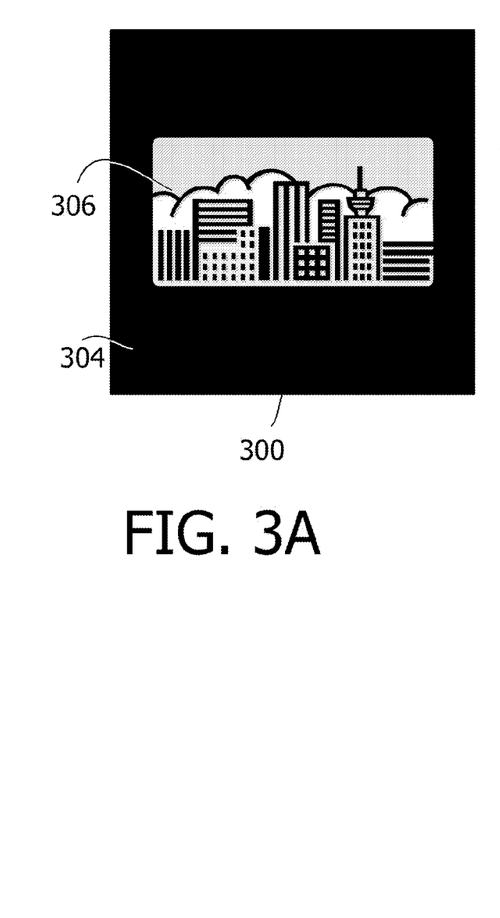
FIG. 3A schematically shows the pixel matrix representing three-dimensional image data, which is provided to the structure of light generating elements when the optical directory means are in the three-dimensional view mode.

FIG. 3A schematically shows the pixel matrix 300 representing three-dimensional image data, which is provided to the structure 104 of light generating elements when the optical directory means 110 are in the three-dimensional view mode. The pixel matrix 300 representing three-dimensional image data comprises the respective driving values. Typically, the pixel matrix 300 representing three-dimensional image data comprises a number of interleaved pixel matrices of two-dimensional pictures of the same object seen from a different angle. A first part 306 of the pixel matrix 300 representing three-dimensional image data corresponds to the set of driving values to be provided to the second part 107-108 of the structure 104 of light generating elements. This first part 306 of the pixel matrix 300 representing three-dimensional image data represents an actual picture. In the depicted case the picture corresponds to a view of a city. The second part 304 of the pixel matrix 300 representing three-dimensional image data corresponds to a set of driving values to be provided to the first part 105-106 of the structure 104 of light generating elements. This second part 304 of the pixel matrix 300 representing three-dimensional image data is a background, i.e. the driving values are all zero, resulting in no light generation by the corresponding light generating elements 105-106.

Figure 3B:
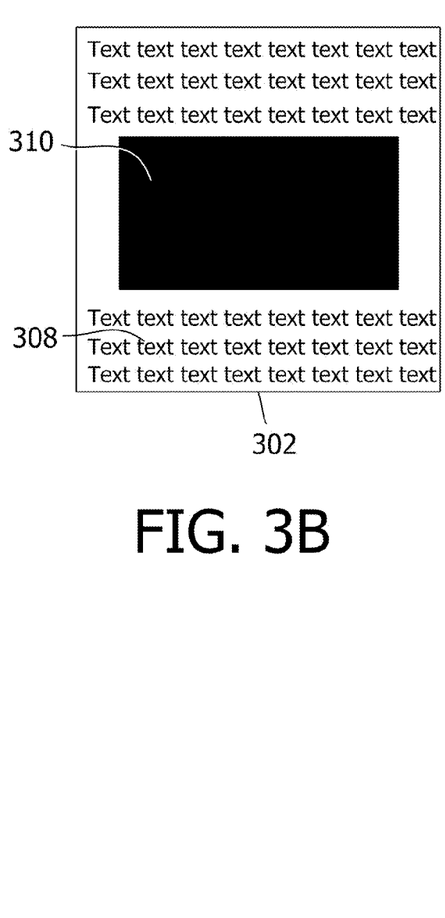
FIG. 3B schematically the corresponding (related to FIG. 3A) pixel matrix representing the two-dimensional image data which is provided to the structure of light generating elements when the optical directory means are in the two-dimensional view mode.

FIG. 3B schematically the corresponding pixel matrix 302 representing the two-dimensional image data which is provided to the structure of light generating elements when the optical directory means are in the two-dimensional view mode. The pixel matrix 302 representing two-dimensional image data comprises the respective driving values. A first part 310 of the pixel matrix 302 representing two-dimensional image data corresponds to the set of driving values to be provided to the second part 107-108 of the structure 104 of light generating elements. This first part 310 of the pixel matrix 302 representing two-dimensional image data is a background, i.e. the driving values are all zero, resulting in no light generation by the corresponding light generating elements 107-108. The second part 308 of the pixel matrix 302 representing two-dimensional image data corresponds to a set of driving values to be provided to the first part 105-106 of the structure 104 of light generating elements. This second part 308 of the pixel matrix 300 representing two-dimensional image data represents an actual picture. In the depicted case the picture corresponds to text.

Figure 3C:
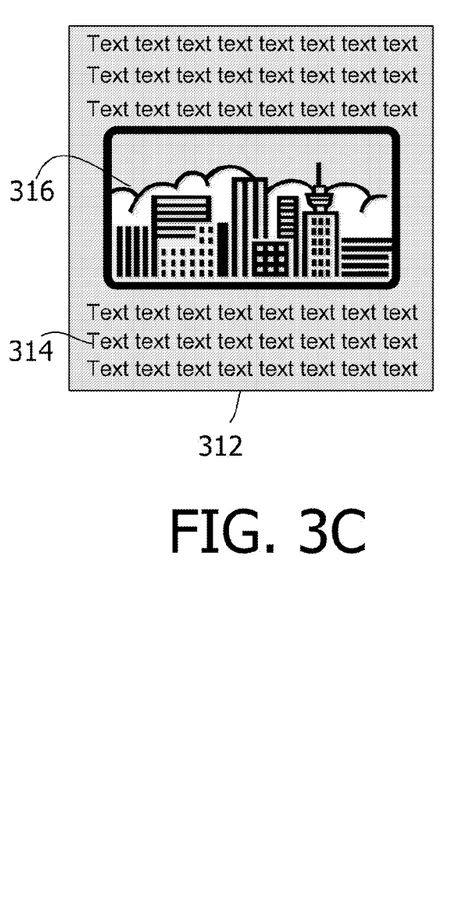
FIG. 3C schematically shows the image which can be observed when the pixel matrixes of FIG. 3A and FIG. 3B are alternately displayed, by the switchable display device according to the invention.

FIG. 3C schematically shows the image 312 which can be observed when the pixel matrixes of FIG. 3A and FIG. 3B are alternately displayed by the switchable display device according to the invention. The effect of the time sequential displaying is that the observed image 312 comprises a three-dimensional window 316 within a two-dimensional text page 314.

Figure 4:
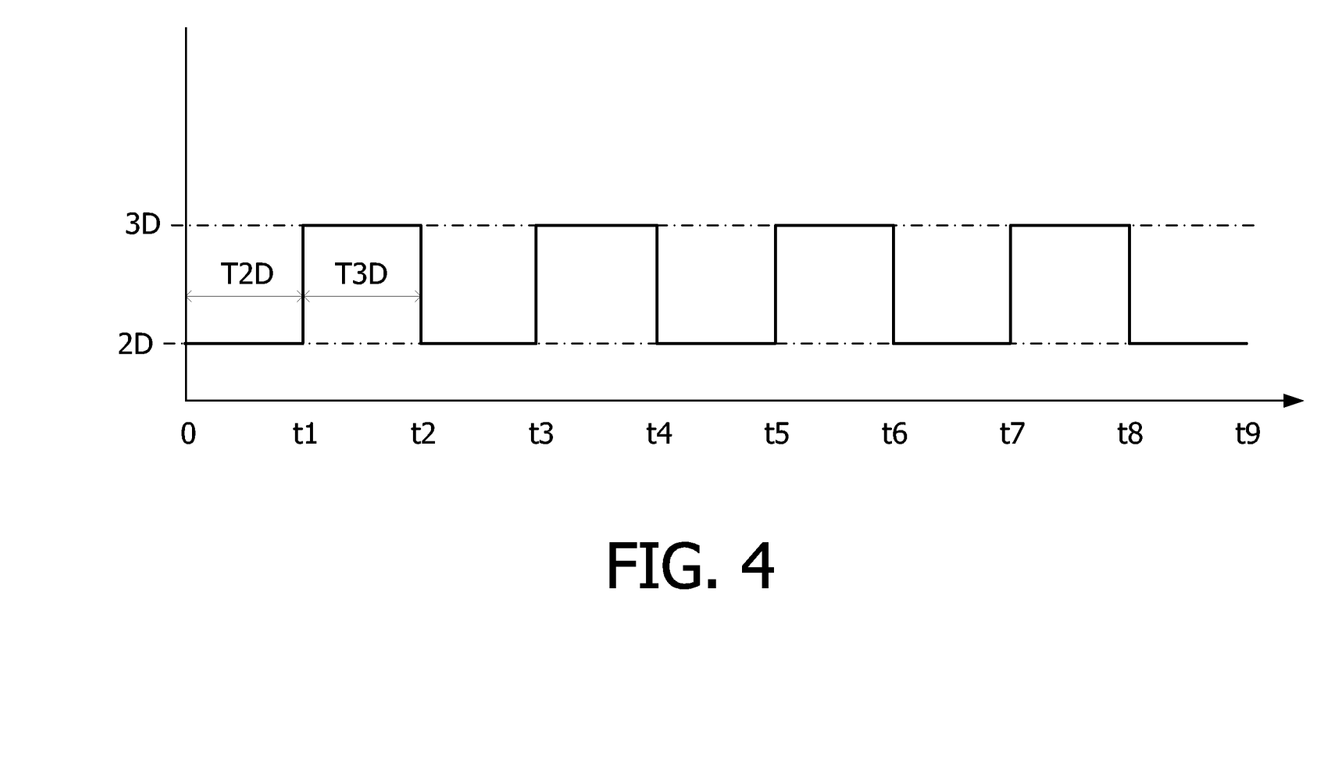
FIG. 4 schematically shows the actual view mode as function of time, whereby the periods in which the optical directory means are in the three-dimensional view mode are substantially equal to the periods in which the optical directory means are in the two-dimensional view mode.

FIG. 4 schematically shows the actual view mode as function of time for an embodiment of the switchable display device 100 according to the invention. There are to view modes:
the three-dimensional view mode which is indicated with 3D on the vertical axis; and
the two-dimensional view mode which is indicated with 2D on the vertical axis.

The horizontal axis corresponds to time.

In the depicted example the periods T3D in which the optical directory means 110 are in the three-dimensional view mode are substantially equal to the periods T2D in which the optical directory means 110 are in the two-dimensional view mode. Preferably, the periods T3D and T2D are less than 10 msec.

As said, alternately pixel matrixes are provided. Below some examples are listed. I2D(i) means a pixel matrix representing two-dimensional image data, while I3D(i) means a pixel matrix representing three-dimensional image data. The "i" is used as an index to refer to different pictures.

The first example indicates that alternately two images are displayed.

| | Time interval | | | | | | | | |
|---|---|---|---|---|---|---|---|---|---|
| | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I2D(1) | I3D(1) | I2D(1) | I3D(1) | I2D(1) | I3D(1) | I2D(1) |

The second example indicates that two sequences are interleaved, i.e. a first sequence representing two-dimensional image data and a second sequence representing three-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I2D(2) | I3D(2) | I2D(3) | I3D(3) | I2D(4) | I3D(4) | I2D(5) |

The third example indicates that copies of a two-dimensional image data are interleaved with a sequence representing three-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I2D(1) | I3D(2) | I2D(1) | I3D(3) | I2D(1) | I3D(4) | I2D(1) |

The fourth example indicates that copies of three-dimensional image data are interleaved with a sequence representing two-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I2D(2) | I3D(1) | I2D(3) | I3D(1) | I2D(4) | I3D(1) | I2D(5) |

Figure 5:
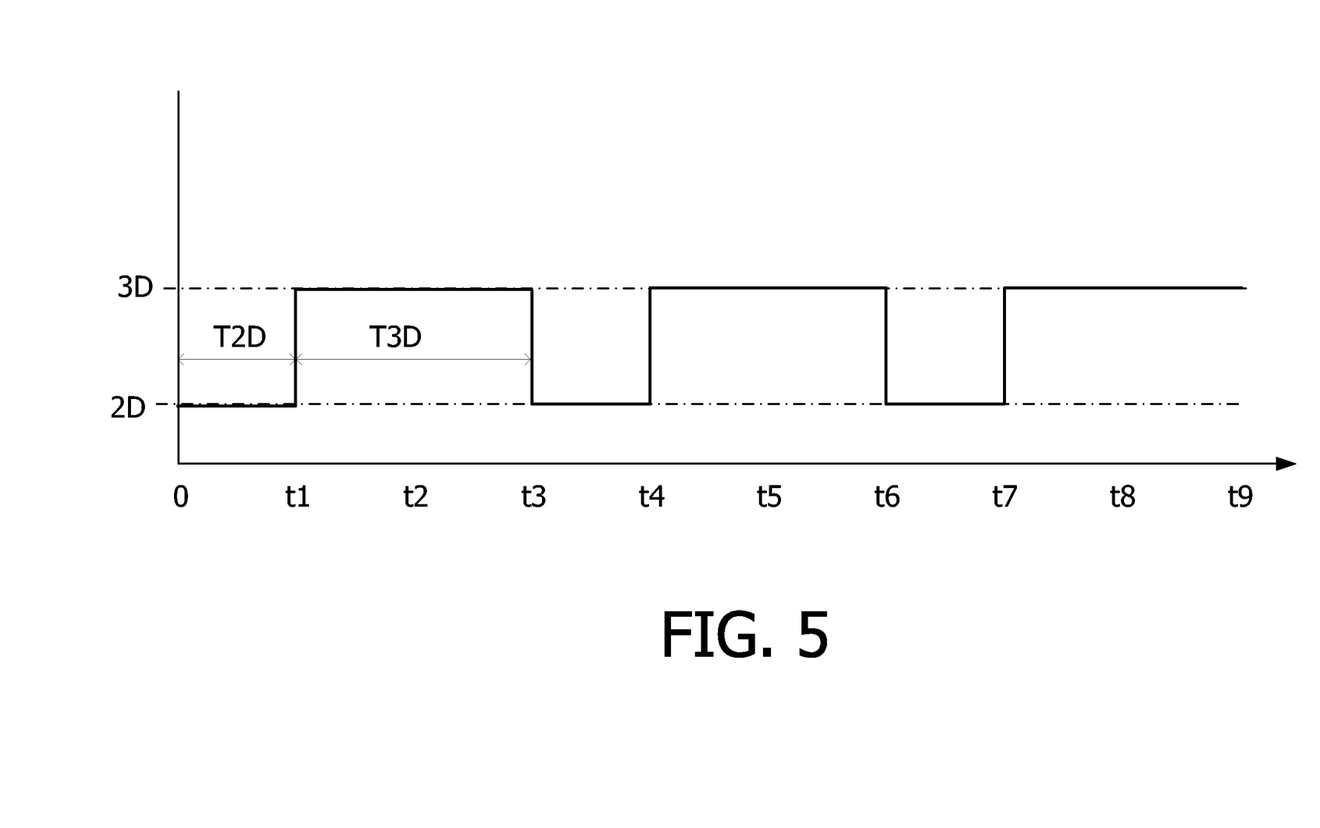
FIG. 5 schematically shows the actual view mode as function of time, whereby the periods in which the optical directory means are in the three-dimensional view mode are substantially twice as long as the periods in which the optical directory means are in the two-dimensional view mode.

FIG. 5 schematically shows the actual view mode as function of time for an embodiment of the switchable display device according to the invention. The horizontal and vertical axes of FIG. 5 correspond to what is described in connection with FIG. 4.

As said, alternately pixel matrixes are provided. Below some examples are listed.

The first example indicates that alternately two images are displayed.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I3D(1) | I2D(1) | I3D(1) | I3D(1) | I2D(1) | I3D(1) | I3D(1) |

The second example indicates that two sequences are interleaved, i.e. a first sequence representing two-dimensional image data and a second sequence representing three-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I3D(2) | I2D(2) | I3D(3) | I3D(4) | I2D(3) | I3D(5) | I3D(6) |

The third example indicates that copies of a two-dimensional image data are interleaved with a sequence representing three-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I3D(2) | I2D(1) | I3D(3) | I3D(4) | I2D(1) | I3D(5) | I3D(6) |

The fourth example indicates that copies of three-dimensional image data are interleaved with a sequence representing two-dimensional image data.

|  | Time interval | | | | | | | | |
| --- | --- | --- | --- | --- | --- | --- | --- | --- | --- |
|  | [0, t1> | [t1, t2> | [t2, t3> | [t3, t4> | [t4, t5> | [t5, t6> | [t6, t7> | [t7, t8> | [t8, t9> |
| Provided pixel matrix | I2D(1) | I3D(1) | I3D(1) | I2D(2) | I3D(1) | I3D(1) | I2D(3) | I3D(1) | I3D(1) |

Figure 6:
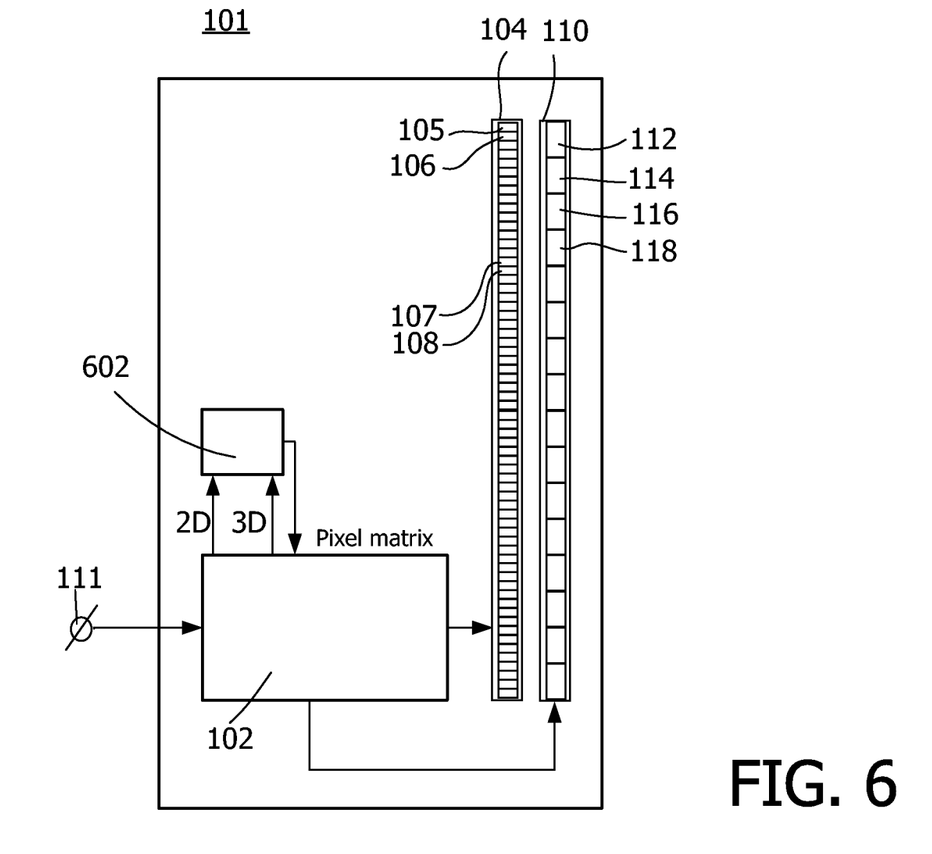
FIG. 6 schematically shows another embodiment of the switchable display device comprising filtering means for deriving background driving values on basis of image data related to the alternative view mode.

FIG. 6 schematically shows another embodiment of the switchable display device 101 comprising filtering means 602 for deriving background driving values on basis of image data related to the alternative view mode. As explained in connection with FIGS. 3A-3C a number of driving values may be set to zero. A disadvantage of that is that the average light output is reduced. Preferably, the "background" driving values are based on actual image data. Preferably, the switchable display device 101 comprises a low pass filter 602 for deriving "background" driving values from image data.

The working of the low pass filter 602 depends on the type of required output. A first pixel matrix representing two-dimensional image data and a second pixel matrix representing three-dimensional image data are provided to the low pass filter 602. The contents of these two pixel matrices have to be combined.

Figure 7A:
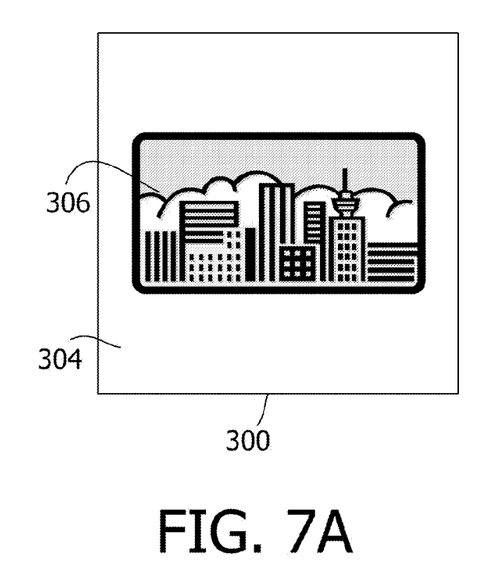
FIGS. 7A and 7B schematically show respective pixel matrixes comprising values representing background driving values which are based on image data related to the alternative view mode.

Suppose that the required output pixel matrix 300 must represent a three-dimensional window 306 within a two-dimensional background 304. Then the low pass filter 602 will compute an intermediate matrix by low pass filtering the provided first pixel matrix representing the two-dimensional image data. After that a number of elements of the intermediate matrix will be updated by replacing the values of these particular elements with copies of the respective elements which are directly derived from the second pixel matrix representing three-dimensional image data. That means that a particular region of interest is updated. Eventually, an output pixel matrix 300 comprising a first set of background driving values which are derived by low pass filtering the first pixel matrix representing two-dimensional image data, and a second set of driving values derived by copying elements of the second pixel matrix representing the three-dimensional image data are provided to the structure of light generating elements. FIG. 7A schematically shows such an output pixel matrix 300.

In FIG. 6 is depicted that the output of the low pass filter 602 is provided to the structure 104 of light generating elements via the receiving means 102. It will be clear that that is optional.

Figure 7B:
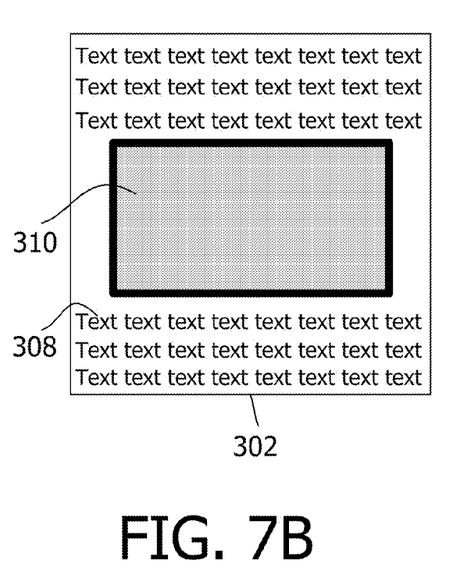

Suppose that the required output pixel matrix 302 must represent a two-dimensional region 308 enclosing a three-dimensional background region 310. Then the low pass filter will compute an intermediate matrix by low pass filtering the provided second pixel matrix representing the three-dimensional image data. After that a number of elements of the intermediate matrix will be updated by replacing the values of these particular elements with copies of the respective elements which are directly derived from the first pixel matrix representing two-dimensional image data. That means that a particular region of interest is updated. Eventually, an output pixel matrix comprising a first set of background driving values which are derived by low pass filtering the second pixel matrix representing three-dimensional image data, and a second set of driving values derived by copying elements of the first pixel matrix representing the two-dimensional image data are provided to the structure of light generating elements. FIG. 7B schematically shows such an output pixel matrix 302.

Figure 7C:
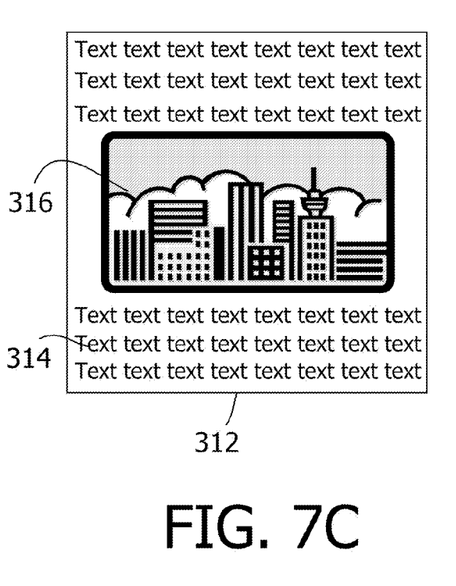
FIG. 7C schematically shows the image which can be observed when the pixel matrixes of FIG. 7A and FIG. 7B are alternately displayed, by the switchable display device according to the invention comprising the filtering means as described in connection with FIG. 6.

FIG. 7C schematically shows the image 312 which can be observed when the pixel matrixes of FIG. 7A and FIG. 7B are alternately displayed by the switchable display device 101 according to the invention. The effect of the time sequential displaying is that the observed image 312 comprises a three-dimensional window 316 within a two-dimensional text page 314.

The average luminance levels of FIG. 7C are higher than the average luminance levels of FIG. 3A if the same image data is provided.

The low pass filter 602 and the receiving means 102 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

Figure 8A:
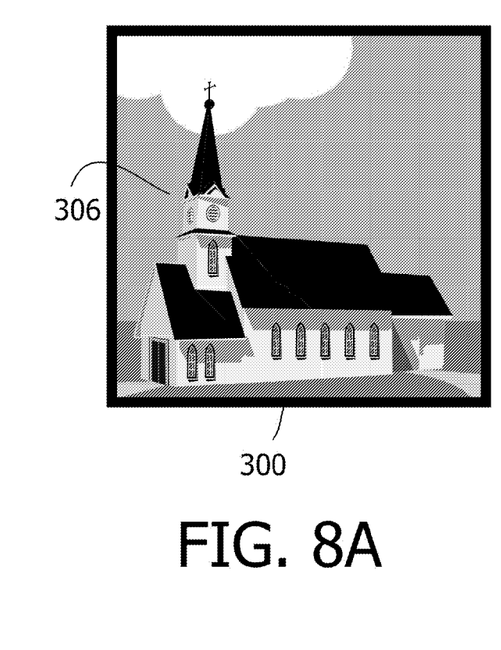
FIGS. 8A and 8B schematically show respective pixel matrixes comprising overlap in foreground driving values.
Figure 8B:
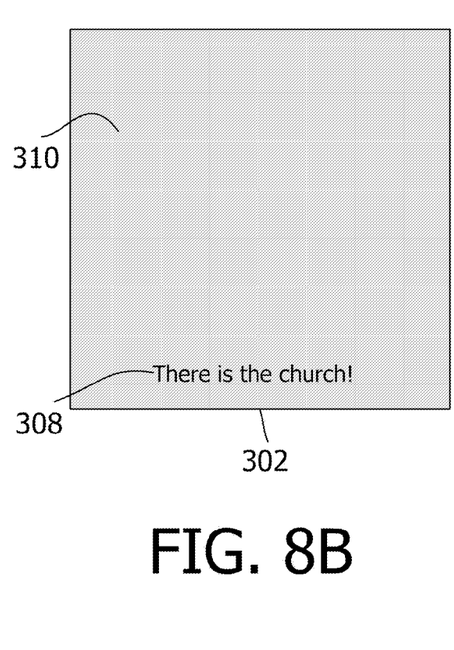

FIGS. 8A and 8B schematically show pixel matrices 300, 302 comprising an overlap in driving values. FIG. 8A schematically shows a second pixel matrix 300 representing three-dimensional image data. Notice that there is no region within the second pixel matrix 300, of elements all having a value being equal to zero. In other words, all elements of the second pixel matrix represent three-dimensional image data.

FIG. 8B schematically shows a first pixel matrix 302 representing a background 310 and a text region 308. The elements of the first pixel matrix 302 representing the background 310 may be all equal to zero. Alternatively the driving values of these elements are mutually equal, but not equal to zero. It may also be that the driving values of these elements are based on three-dimensional image data.

Figure 8C:
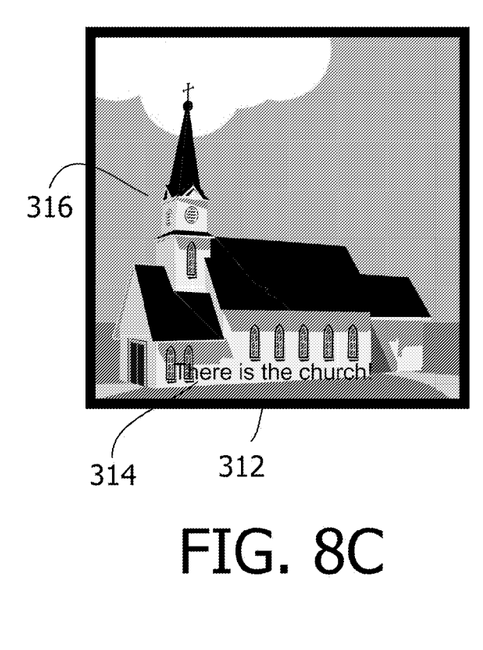
FIG. 8C schematically shows the image which can be observed when the pixel matrixes of FIG. 8A and FIG. 8B are alternately displayed.

FIG. 8C schematically shows the image 312 which can be observed when the pixel matrixes of FIG. 8A and FIG. 8B are alternately displayed by the switchable display device according to the invention. The effect of the time sequential displaying is that the observed image 312 comprises a three-dimensional image wherein text 314 is blended.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names.

The invention claimed is:

1. A switchable display device arranged to switch between a two-dimensional view mode and a three-dimensional view mode, the switchable display device comprising:
a structure of light generating elements for generating light on basis of respective driving values; and
optical directory means for directing the generated light in dependence of an actual view mode, the actual view mode being either the two-dimensional view mode or the three-dimensional view mode,
the switchable display device being arranged to switch between the two-dimensional view mode and the three-dimensional view mode at a predetermined frequency and to alternately display:

two-dimensional image data by providing corresponding driving values to at least a first part of the structure of light generating elements, while the optical directory means are in the two-dimensional view mode; and three-dimensional image data by providing corresponding driving values to at least a second part of the structure of light generating elements, while the optical directory means are in the three-dimensional view mode, the second part of the structure of light generating elements being complementary with the first part of the structure of light generating elements, wherein the periods during which three-dimensional image data is displayed are substantially equal to or substantially two times as long as the periods in which two-dimensional image data is displayed.

2. A switchable display device as claimed in claim 1, wherein the predetermined frequency is higher than 50Hz.

3. A switchable display device as claimed in claim 1, wherein the second part of the structure of light generating elements is provided with background driving values which result in substantially no light generation, while the optical directory means are in the two-dimensional view mode.

4. A switchable display device as claimed in claim 1, wherein the first part of the structure of light generating elements is provided with further background driving values which result in substantially no light generation, while the optical directory means are in the three-dimensional view mode.

5. A switchable display device as claimed in claim 1, further comprising a first low pass filter for deriving background driving values from the three-dimensional image data and wherein the background driving values are provided to the second part of the structure of light generating elements while the optical directory means are in the two-dimensional view mode.

6. A switchable display device as claimed in claim 1, further comprising a second low pass filter for deriving further background driving values from the two-dimensional image data and wherein the further background driving values are provided to the first part of the structure of light generating elements while the optical directory means are in the three-dimensional view mode.

7. A switchable display device as claimed in claim 1, wherein the optical directory means comprises a set of lenses which can be switched between a first state and a second state, the first state corresponding to the two-dimensional view mode and the second state corresponding to the three-dimensional view mode.

8. A switchable display device as claimed in claim 1, wherein the optical directory means comprises a set of barriers which can be switched between a substantially transparent state and a substantially absorbing state, the substantially transparent state corresponding to the two-dimensional view mode and the substantially absorbing state corresponding to the three-dimensional view mode.

9. A switchable display device as claimed in claim 1, wherein the optical directory means comprises liquid crystals and electrodes for providing a voltage across the liquid crystals.

* * * * *